Figure 1:
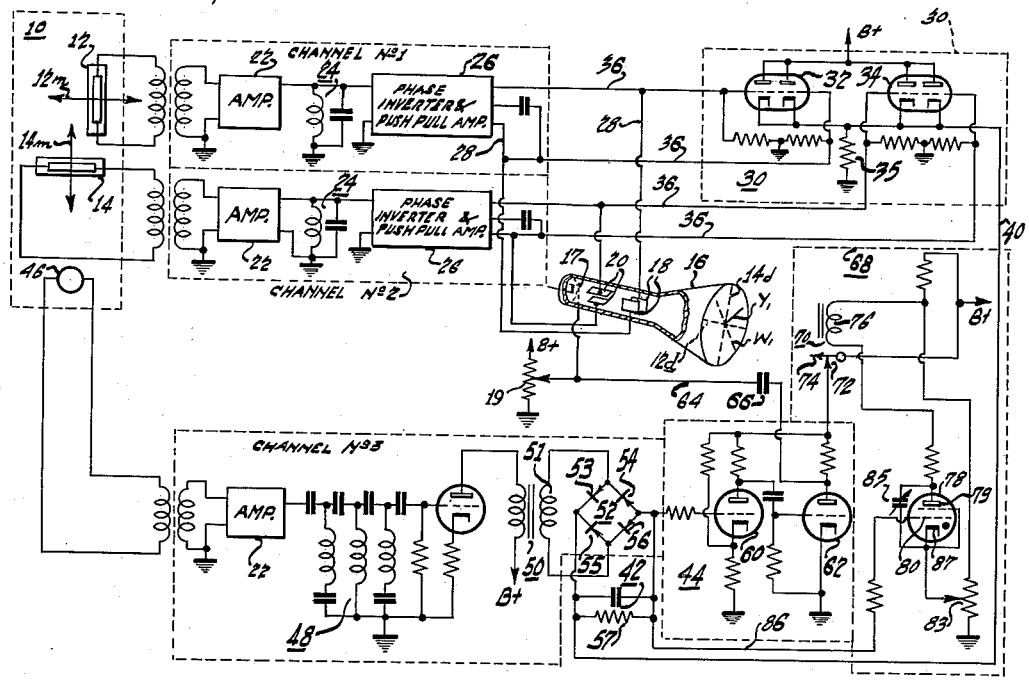

Dec. 27, 1960

J. F. PRICE 2,966,657

ACOUSTIC DIRECTION FINDER

Filed March 31, 1949

INVENTOR
JAMES F. PRICE
BY
ATTORNEY

United States Patent Office 2,966,657
Patented Dec. 27, 1960

2,966,657
ACOUSTIC DIRECTION FINDER

James F. Price, Erlton, N.J., assignor, by mesne assignments, to the United States of America as represented by the Secretary of the Army Filed Mar. 31, 1949, Ser. No. 84,706

7 Claims. (Cl. 340—16)

This invention relates to improvements in wave direction finders, and more particularly to apparatus for determining the direction of arrival of waves of energy at an observation point.

The principles of my invention find particular application in apparatus for locating the origin of sound waves due to gun fire, and while not limited thereto, will be described with particular reference to apparatus of this type.

The problem of locating the point of origin of sound waves due to gun fire, such as machine-gun fire, is complicated by the fact that two interfering sound waves are involved. One of the sound waves is due to the explosion of the propelling charge, and is generally referred to as the muzzle blast. The other sound wave is due to the passage of the projectile through the air, and is generally referred to as the ballistic wave. Since the muzzle blast wave has a substantially fixed point of origin, while the ballistic waves are continuously propagated at points along the projectile path, indications due to the ballistic waves tend to interfere with the desired indication due to the muzzle blast wave. It has been found that the principal frequency components of the muzzle blast wave from small arms fire occur within a band of frequencies between zero and 400 cycles per second, while the ballistic wave contains components ranging from approximately 750 cycles to 5,000 cycles or more. While interference due to ballistic waves can be eliminated to some extent by means of filter circuits, it is extremely difficult to remove all traces of the ballistic waves from the desired indication. It is, accordingly, a principal object of the present invention to provide an improved wave direction finder responsive to waves of predetermined frequencies.

Wave direction indicators in which bi-directional receivers or transducers are used present the further problem of "sensing," or resolving the ambiguity between the two possible arrival directions of a detected wave. For example, a so-called "cosine law" microphone exhibits a directional characteristic which is in the form of a "figure eight," bisected longitudinally by the directional axis of the microphone. Sound waves approaching such a microphone from either of two directions 180 degrees apart, will cause the microphone to generate output signals of equal intensity, making it difficult to tell in which of the two possible directions a given wave is traveling. However, as is suggested by the term "cosine law," a microphone of this type will respond to a given half cycle (i.e. a "compression" or a "rarefaction") of a sound wave by generating a half cycle of voltage of either of two polarities, depending on the direction in which the sound wave approaches the microphone. This is to say, a cosine law microphone will respond to a compressional half cycle in a sound wave approaching the microphone from one direction by generating a positive half cycle of voltage, and will respond to the same half cycle in a sound wave approaching the microphone from the opposite direction by generating a negative half cycle of voltage. Since the first half cycle of an explosion sound wave is always a compressional half cycle, it has been suggested that "sensing" can be achieved with cosine law microphones in an explosion locating device by limiting the output therefrom to the first half cycle of voltage due to an explosion wave, provided that the first half cycle of the wave is larger than any succeeding half cycle (see, e.g., U.S. Patent 2,406,014). It is a further object of my invention to provide an improved "sensing" arrangement for a sound wave direction finder which will provide an indication of only the first half cycle of an approaching sound wave regardless of the relative magnitudes of the first half cycle and succeeding half cycles.

In accordance with my invention, the foregoing and other objects and advantages are attained by deriving indicator control voltages of different polarities from preselected frequency components of waves arriving at the apparatus. One of the voltages is derived principally from waves having frequencies within a preselected frequency band (e.g. "muzzle blast" sound waves), while the other voltage is derived principally from waves having frequencies outside of the preselected frequency band (e.g. "ballistic" sound waves). The two voltages are combined in opposition, and the resultant voltage is used to increase the response of the indicator when the one control voltage predominates, and to decrease the response of the indicator when the other control voltage predominates. The same combination of control voltages is also used to energize a "threshold" type network for limiting the time during which the indicator will respond. The response of the indicator thereby is limited to preselected frequency components and preselected time intervals.

Figure 2:
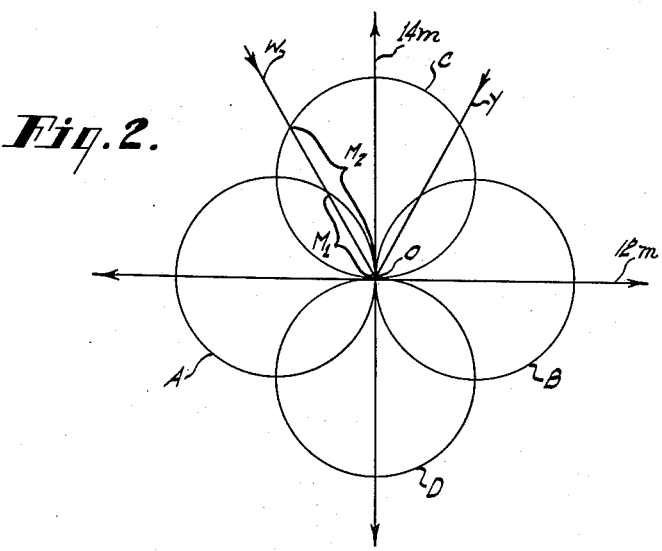

A more complete understanding of the invention may be had by reference to the following description of an illustrative embodiment thereof, when considered in connection with the accompanying drawing in which:

Figure 1 is a schematic diagram of a sound wave direction finding apparatus embodying the principles of my invention, and Figure 2 is a diagram illustrating the response characteristics of two cosine law microphones.

The apparatus shown in Fig. 1 will be described in connection with the problem of locating the direction of arrival of sound waves originating in small arms gun fire, although it will be apparent to those skilled in the art that the principles of the invention are equally applicable to other wave direction finding apparatus. The apparatus of Fig. 1 includes a transducer assembly 10 containing two cosine law, bi-directional microphones 12, 14, having their axes of maximum response $12m$, $14m$ arranged at right angles to each other in a common plane. The transducer assembly 10 also includes an omnidirectional third microphone 46 which will be considered further hereinafter. The microphones in the transducer assembly 10 are preferably mounted in a suitable casing, the exact structure of which will depend on the particular use for which the apparatus is intended. For simplicity, such structural details have been omitted in the drawing since they form no part of the present invention per se.

The two microphones 12 and 14 may be of the so-called pressure gradient type (see, e.g., Olson and Massa—"Applied Acoustics," 1939, p. 124 et seq.) or of any other type having a cosine law response characteristic. In the particular apparatus being described, for locating a source of gun fire, a "hot wire" microphone having two spaced grids forming two of the arms of a Wheatstone bridge may be used to advantage because of the vibrational resistance and predominantly low frequency response of such a microphone.

The composite directional pattern of the two cosine law microphones 12, 14 in Fig. 1 will comprise a cloverleaf pattern as shown in Fig. 2, wherein the two lobes A, B, lying along the axis 12m, represent the relative reponse of the microphone 12 to waves arriving at the point O from any given direction in the plane of the drawing, the two lobes C, D, lying along the axis 14m, represent the relative response of the microphone 14 to similar waves, and the point O represents the location of the transducer assembly 10. For example, the microphones 12 and 14 will generate electrical outputs of relative magnitudes $M_1$ and $M_2$, respectively, in response to a sound wave arriving at the point O along a line W.

In the apparatus shown in Fig. 1, each of the directional microphones, 12 and 14, is connected to one of the sets of deflecting plates, 18 and 20, of a cathode ray indicator tube 16, through identical signal channels, 1 and 2, respectively. Each of the channels for the microphones 12, 14 contains an unbalanced amplifier stage 22, a filter circuit 24 for attenuating signals having frequencies above, say, 400 c.p.s., and a phase inverter and push-pull amplifier stage 26 (see, e.g., Terman-Radio Engineers Handbook, 1943, pp. 382–385) for supplying signals (balanced with respect to ground) to the cathode ray tube 16 and to other circuits in the apparatus.

Theoretically, the portion of the apparatus thus far described will respond to a sound wave in the following manner. The cathode ray beam will be deflected horizontally (along the scale-line 12d) by signals from the microphone 12, and vertically (along the scale-line 14d) by signals from the microphone 14. In the case of a wave approaching along the line W in Fig. 2, the relative amount of horizontal deflection of the cathode ray beam will correspond to the quantity $M_1$ in Fig. 2, and the relative amount of vertical deflection of the cathode ray beam will correspond to the quantity $M_2$. The resultant directional indication is shown as a dot-dash line $W_1$ on the screen of the cathode ray tube 16 in Fig. 1.

Unfortunately, the above-described theoretical operation represents an ideal case seldom attained in practice, and the interpretation of the cathode ray pattern is usually complicated, not only by the ambiguity represented by the excursion of the line $W_1$ on both sides of the intersection of the indicator scale markings 12d and 14d, but also by the reception of other waves at the transducer assembly 10. For example, in the case of gun fire location, the arrival of ballistic sound waves at the transducer assembly may be indicated on the cathode ray screen together with the desired indication of the muzzle blast wave. It might be assumed that the filters 24 would adequately dispose of interfering ballistic sound waves having frequencies above 400 c.p.s., but it will be appreciated that a filter circuit is a device which merely gives preference to signals of one frequency while attenuating others. When high intensity signals of undesired frequency reach the transducer assembly 10, a portion of such signals will pass through the amplifier channels, 1, 2, in spite of attenuation in the filters 24. Accordingly, it is necessary to provide further means for inhibiting the display of undesired signals, as well as means for resolving the ambiguity due to the bi-directional characteristics of the microphones 12, 14.

Considering, first, the problem of ballistic sound wave interference, the circuits to be described comprise means for increasing the response of the indicator 16 on the arrival of sound wave components of the desired frequencies (e.g. muzzle blast waves), while decreasing the response of the indicator on the arrival of wave components of undesired frequencies (e.g. ballistic waves), so that the indicator will respond only during the intervals when waves of the desired frequency predominate at the transducer assembly 10.

In the apparatus shown in Fig. 1, the intensity of the cathode ray beam in the cathode ray tube 16 is set slightly below the threshold of visibility by applying a bias voltage to the intensity control grid 17 of the cathode ray tube from a potentiometer 19 connected across the voltage supply source (not shown). Control voltages for varying the intensity of the cathode ray beam are derived from the waves reaching the transducer assembly 10, and are applied to the intensity control grid 17 of the tube 16 through an indicator control circuit 44, in a manner to be described.

One of the intensity control voltages for the cathode ray beam is derived from the signals generated by the directional microphones 12, 14, in a cathode follower network 30. The network 30 contains two dual triode tubes 32, 34 having a common cathode load resistor 35. The normal current through the tubes 32, 34 and the resistor 35 biases the tubes 32, 34 very nearly to cut-off. Each of the tubes 32, 34 is connected to one of the signal channels 1, 2, and each functions as a degenerative push-pull amplifier in response to signals from the microphone channels 1, 2. For example, when an alternating signal is generated in the microphone channel 1 in response to the arrival of a sound wave at the microphone 12, the two sections of the tube 32 will conduct current on alternate half cycles of signal voltage, developing a positive half cycle of voltage across the resistor 35 for each half cycle of any signal passing through the microphone channel 1. The operation of the tube 34 will be similar with respect to signals generated by the microphone 14. The output of the network 30 is connected to the indicator control circuit 44 through a lead 40 and a coupling capacitor 42, so that any pulsating positive voltages developed in the network 30 from signals in either or both of the microphone channels 1, 2 will appear at the input of the control circuit 44.

As was previously stated, the transducer assembly 10 contains an omnidirectional microphone 46 in addition to the two bi-directional microphones 12 and 14. A second intensity-control voltage for the cathode ray tube 16 is derived from sound waves received by the microphone 46.

The microphone 46 is connected to a channel 3 which includes an unbalanced amplifier 22 and a filter network 48 designed to attenuate signals having a frequency below, say, 700 c.p.s. Accordingly, signals obtained from the channel 3 for the microphone 46 will consist of predominately high frequency components as distinguished from the signals in channels 1 and 2, which will contain predominately low frequency components. The third channel 3 also contains an output transformer 50, and a full-wave rectifier network 52 connected across the secondary winding 51 of the transformer 50. The elements 53—56 of the rectifier network 52 are so connected that a pulsating negative voltage will be supplied to the indicator control circuit 44 for any signals passing through the rectifier network 52 from the third channel. That is, on one half cycle of a signal across the secondary winding 51 of the transformer 50, electron current will flow through the secondary winding 51 of the transformer, through the rectifier 53, through the resistor 57 and through the rectifier 56. On alternate half cycles, current will flow through the secondary winding 51 of the transformer 50, through the rectifier 55, through the resistor 57, and through the rectifier 54.

As was already noted, a control voltage from the cathode follower network 30 will be a pulsating voltage which is positive with respect to ground. On the other hand, as just explained, the control voltage developed from signals generated by the microphone 46 will be negative with respect to ground. Accordingly, the control voltage derived from signals passing through the third channel will oppose the control voltage derived from channels 1 and 2.

The indicator control circuit 44 comprises a two-stage amplifier, wherein a positive voltage applied to the input stage 60 will appear as an amplified positive voltage at the output of the second stage 62 on the lead 64, whereas a negative input voltage will appear as an amplified negative voltage on the output lead 64. The output of the control circuit 44 is connected to the intensity control grid 17 of the cathode ray tube 16 through the output lead 64 and a coupling capacitor 66.

As an example of the operation of the circuits thus far described, let it be assumed that a muzzle blast signal arrives at the transducer assembly 10 one tenth of a second after the arrival of a ballistic wave. Upon the arrival of the ballistic wave, some portion thereof will pass through the first and second microphone channels 1, 2, causing deflection of the cathode ray beam. At the same time, the cathode follower network 30 will respond to the signals in the first and second channels 1, 2, deriving therefrom a pulsating positive voltage which will appear at the input of the indicator control circuit 44. This pulsating positive voltage would pass through the control circuit 44 and raise the intensity of the cathode ray beam above the level of visibility but for the simultaneous occurrence of a pulsating negative voltage at the output of the third microphone channel 3. Since the high frequency ballistic signals will be considerably attenuated in the first and second microphone channels by the filter circuit 24, but will not be attenuated in the third channel, the pulsating negative voltage from the third channel will be considerably larger than the pulsating positive voltage from the first and second channels. Accordingly, although the cathode ray beam will be deflected due to the signals in the first and second channels 1, 2, it will not reach the screen of the tube 16 with sufficient intensity to produce any indication therein. However, one-tenth of a second later when the muzzle blast wave reaches the transducer assembly 10, the situation will be reversed. The low frequency signals from the muzzle blast wave will pass through the first and second channels, and will be converted into a relatively large, pulsating positive voltage in the network 30, while the attenuation of the low frequency signals in the filter circuit 48 for the third channel will result in the development of relatively small pulsating negative voltage in the rectifier network 52. Consequently, the positive voltage at the input of the control circuit 44 will override the negative voltage, and will raise the intensity of the cathode ray beam above the level of visibility, resulting in a display of the deflection of the cathode ray beam due to the muzzle blast waves.

In the event that a muzzle blast wave and a ballistic wave arrive at the transducer assembly 10 at exactly the same instant, which is extremely unlikely, an indication due to the muzzle blast wave will still be obtained unless the ballistic wave is of considerably greater relative intensity than the muzzle blast wave. In the majority of cases, there is a sufficient interval between the arrival time of the two waves to preclude the suppression of the muzzle blast indication by negative voltage pulses derived from ballistic waves.

While the circuits thus far described substantially eliminate high frequency interference signals, there remains the problem of resolving the 180° ambiguity which is inherent in the use of bi-directional transducers. In accordance with my invention, this ambiguity is eliminated by means of a "threshold" type sensing circuit 68. The sensing circuit 68 controls the anode voltage supply for the tubes 60, 62 in the indicator control circuit 44.

The sensing circuit 68 includes a relay 70 having a fixed contact 72, a movable armature-contact 74, and an operating winding 76 which is connected in series with a gas tetrode tube 78. The fixed contact 72 and the movable contact 74 of the relay 70 are connected in the anode voltage supply circuit for the tubes 60, 62 in the indicator control network 44, so that the tubes 60, 62 in the control network 44 will receive plate voltage only while the relay 70 is deenergized. Current flow through the relay winding 76 will cause the relay contacts 72, 74 to open, removing the anode voltage from the tubes 60, 62.

The gas tube 78 is of the so-called grid-start, plate-stop type wherein the control grid 80 is utilized to initiate the flow of tube current and thereafter loses control of the tube current. The control grid 80 of the tube 78 is connected to the output of the three microphone channels by a lead 86, so that the control grid voltage for the tube 78 will be the same as the input voltage for the indicator control network 44. The cathode voltage for the tube 78 can be adjusted by means of a potentiometer 83 in order to select the exact control grid voltage necessary to initiate current flow in the tube 78.

Prior to the arrival of any waves at the transducer assembly 10, there will be no current flowing in the gas tube 78, so that the relay 70 will be deenergized and the indicator control network 44 will be receiving anode voltage through the contacts 72, 74 of the relay. Accordingly, the control network 44 will be in condition to respond to any signal voltages applied to the input thereof. If a ballistic wave reaches the transducer assembly 10, the resultant pulsating negative voltage derived therefrom will have no effect on the gas tube 78, and the control network 44 will operate in the manner previously described. However, when a muzzle blast wave reaches the transducer assembly 10, the first positive voltage pulse derived therefrom which is large enough to trigger the gas tube 78 will cause the relay 70 to operate, opening the relay contacts 72, 74. Due to the mechanical inertia of the relay 70, and the electrical inertia of the relay winding 76, the opening of the relay contacts 72, 74 will be delayed for a preselected interval of a few milleseconds, during which time the cathode ray beam will be intensified by the same voltage pulse that triggered the gas tube 78. As soon as the relay contacts 72, 74 open, the anode voltage for the indicator control network 44 will be cut-off, and the intensity of the cathode ray beam will drop below the limit of visibility. The control network 44 then will remain inoperative until the gas tube 78 stops conducting and deenergizes the relay 70, whereupon the control network 44 and the sensing circuit 68 will be readied for further operation. Thus, the cathode ray display will be limited to only a preselected portion of a signal sufficiently large to cause firing of the gas tube 78.

The time interval between the firing of the gas tube 78 and the opening of the relay contacts 72, 74 can be varied (by varying the mechanical loading of the armature or by varying the electrical inertia of the relay winding 76 in obvious manner) to limit the cathode ray display to any desired portion of a given signal. This time interval preferably will be slightly less than ½ the period of the highest frequency wave involved in order to show only the first half cycle of any given wave. In the present instance, 400 cycles can be considered as the highest frequency involved, in which case the selected time interval would be of the order of 1.25 milliseconds. This prevents the indication of any portion of a detected wave other than the first half-cycle thereof, and since the relative polarity of the first half cycle of output voltage from the microphones 12, 14 in Fig. 1 will depend on the direction of arrival of the wave with respect to the directional pattern for each microphone, as was previously explained, ambiguous indications will be avoided. For example, the first half cycle in a muzzle blast wave that approaches the transducer assembly along a line Y in Fig. 2 will produce an indication $Y_1$ on the screen of the tube 16 in Fig. 1. It will be noted that the line $Y_1$ does not extend through the intersection of the scale markings 12d, 14d on the screen of the tube 16, and, consequently, there can be no question as to the direction of arrival of the wave.

The recovery time for the sensing circuit 68 (i.e. the time interval during which the gas tube 78 will conduct current) can be controlled by connecting a capacitor 85 between the anode 79 and the cathode 87 of the tube 78.

When the tube 78 begins to conduct current, the resultant drop in voltage at the anode 79 will be passed on to the cathode 87 through the capacitor 85, maintaining the cathode 87 at a subnormal voltage until the capacitor 85 acquires a charge sufficient to compensate for the original voltage drop at the anode 79 of the tube 78. As is well known, the time required for the capacitor 85 to become charged is determined by the product of the resistance and the capacitance in the circuit, and can be regulated by varying the capacitance of the capacitor 85. In the case of gun-fire locating equipment, the recovery time for the sensing circuit may be of the order of 30 milliseconds, and in general will be selected to be slightly longer than the average duration of the particular type of explosion wave involved.

It will be noted that the sensing circuit 68 will not be operated by the arrival of the ballistic wave at the transducer 10, nor will it be affected by random noise voltages and the like provided the cathode bias on the gas tube 78 is sufficiently high to prevent triggering of the gas tube by voltages of less than predetermined intensity. Furthermore, the circuit 68 does not depend for its operation on the relative magnitude of any two or more cycles in a wave train, but will respond only to the first half cycle which is large enough to trigger the gas tube 78, and will be indifferent to any signals, regardless of intensity, which are generated by the microphones 12, 14 during the recovery time of the sensing circuit 68.

It will be appreciated that the invention is not limited to the use of a gas tube for controlling the operation of the relay 70 in the sensing circuit 68, nor is a relay essential for controlling the anode voltage supply to the indicator control tubes 60, 62. Similar types of "threshold" circuits, such as so-called start-stop multivibrators, and so-called gate circuits, all of which are well known in the art, could be used in place of the particular circuit elements shown.

It is also apparent that the system of frequency selection described is not limited to use with directional transducers, but is equally suitable for use in a system involving a plurality of spaced-apart non-directional transducers.

Since many such changes could be made in the apparatus shown and described, all within the scope and spirit of my invention, the foregoing is to be construed as illustrative, and not in a limiting sense.

What is claimed is:

1. In an apparatus for indicating the direction of arrival of waves of predetermined frequencies, first means including a transducer element for deriving from waves arriving at said apparatus a first control voltage derived predominantly from wave components having frequencies other than said predetermined frequencies, second means for deriving from waves arriving at said apparatus a second control voltage opposite in polarity to said first control voltage and derived predominantly from wave components of said predetermined frequencies, indicating means coupled to said second means for producing an indication of the direction of arrival of said waves at said apparatus, a first circuit coupled between said first named means and said indicating means for combining said first and said second control voltages in opposition whereby to cancel any portion of said second control voltage which is derived from wave components having frequencies other than said predetermined frequencies, said indicating means being operative only in response to a predominance of said second control voltage, and a second circuit coupled to said first circuit and responsive to a predominance of said second control voltage for extinguishing said second control voltage after a selected time interval whereby to limit the operating time of said indicating means.

2. Apparatus as defined in claim 1 wherein said second means includes (1) a pair of directional transducer elements having their axes of maximum response disposed in quadrature, and (2) means for deriving said second control voltage from waves received by said directional transducer elements; and said first means includes a third omnidirectional transducer element, and means for deriving said first control voltage from waves received by said third transducer element.

3. Apparatus as defined in claim 1 wherein said indicating means comprises a cathode ray tube having a beam-intensity control electrode, said first circuit being connected between said first named means and said control electrode whereby to control the intensity of the cathode ray beam in said tube in accordance with the relative magnitudes of said control voltages.

4. In an apparatus for indicating the arrival direction of waves of predetermined frequencies, means including (1) a first circuit for generating a first control voltage predominantly from components of waves received by said means having frequencies other than said predetermined frequencies, (2) a second circuit for generating a second control voltage opposite in polarity to said first control voltage from wave components of said predetermined frequencies, indicating means coupled to said first named means for producing an indication of the arrival direction of waves at said apparatus, a third circuit coupled between said first named means and said indicating means for combining said first and said second control voltages in opposition whereby to cancel any portion of said second control voltage which is generated from wave components having frequencies other than said predetermined frequencies, and a fourth circuit coupled to said first circuit and responsive only to a predominance of said second control voltage for rendering said second circuit inoperative after a selected time interval whereby to limit the operating time of said indicating means.

5. An apparatus for indicating the arrival direction of sound waves of predetermined frequencies, said apparatus comprising a pair of directional microphones having their axes of sensitivity disposed in quadrature, a cathode ray indicator tube coupled to said microphones to indicate the arrival direction of sound waves at said microphones and having a beam-intensity control electrode, a first circuit coupled between said microphones and said control electrode for supplying a beam-intensifying voltage to said control electrode in response to the arrival of waves of said predetermined frequencies at said microphones, a third microphone, a second circuit coupled between said third microphone and said control electrode for supplying a beam-inhibiting voltage to said control electrode in response to the arrival at said microphones of sound waves having frequencies other than said predetermined frequencies, a circuit coupled to said first circuit for effectively decoupling said first and said second circuit from said control electrode for a selected interval starting at a predetermined time after the arrival of said waves at said microphones.

6. In an apparatus for determining the arrival direction of sound waves, in combination, a plurality of microphones for converting received sound waves into electrical signals, first frequency sensitive circuit means coupled to said microphones for deriving a pulsating D.C. voltage of one polarity from signals of predetermined frequencies generated by said microphones, second frequency sensitive circuit means coupled to said microphones for deriving a pulsating D.C. voltage of polarity opposite to said one polarity from signals of other than said predetermined frequencies generated by said microphones, an indicator for producing an indication of the arrival direction of said sound waves at said microphones and operative only in response to D.C. voltage of said one polarity, and means for applying said one polarity and said opposite polarity pulsating D.C. voltages to said indicating means.

7. In an apparatus for determining the arrival direction of sound waves, in combination, means including directional transducer elements for converting received waves into electrical signals representative of the arrival direction of said sound waves at said apparatus, an indicator responsive to said electrical signals for producing an indication of said arrival direction, said indicator including a cathode ray tube having a beam intensity control electrode, and circuit means coupled between said transducer elements and said indicator for inhibiting the response of said indicator, said circuit means including a gas tube operated relay circuit operatively responsive only to a signal of predetermined magnitude from said transducer elements for initiating said inhibiting action.

References Cited in the file of this patent

UNITED STATES PATENTS

| | | |
|---|---|---|
| 2,216,517 | Oosterhuis | Oct. 1, 1940 |
| 2,237,457 | Tellegen | Apr. 8, 1941 |
| 2,282,402 | Hefele | May 12, 1942 |
| 2,405,604 | Pope | Aug. 13, 1946 |
| 2,406,014 | Harry | Aug. 20, 1946 |
| 2,434,644 | Fairweather | Jan. 20, 1948 |
| 2,489,254 | Arnold et al. | Nov. 29, 1949 |
| 2,538,040 | Prichard | Jan. 16, 1951 |